United States Patent [19]

Ishikawa et al.

[11] Patent Number: 5,367,160
[45] Date of Patent: Nov. 22, 1994

[54] METHOD FOR FORMING AND DENATURING PARTICLES

[75] Inventors: Masazumi Ishikawa, Uji; Hiroaki Misawa, Takatsuki; Noboru Kitamura, Kyoto, all of Japan

[73] Assignee: Research Development Corporation of Japan, Tokyo, Japan

[21] Appl. No.: 24,314

[22] Filed: Mar. 1, 1993

[30] Foreign Application Priority Data

Mar. 2, 1992 [JP] Japan .................................. 4-044847

[51] Int. Cl.⁵ ............................................. B01J 19/08
[52] U.S. Cl. ......................................... 250/251; 522/2
[58] Field of Search ............................. 250/251; 522/2

[56] References Cited

U.S. PATENT DOCUMENTS 5,212,382  5/1993  Sasaki et al. ..................... 250/251

FOREIGN PATENT DOCUMENTS

1728252  4/1992  U.S.S.R. ................................. 522/2

Primary Examiner—Jack I. Berman
Attorney, Agent, or Firm—Wenderoth, Lind & Ponack

[57] ABSTRACT

A method for forming a polymer particle is provided which involved irradiating a polymer solution with a laser beam. The polymer particle is formed at the focal area of the beam. The particle is reversible and disappears upon discontinuing the irradiation. Irreversible particles can be formed by including a reactive monomer in the solution. The particles are trapped by the beam and may be moved for processing and modification by moving the laser beam.

7 Claims, 10 Drawing Sheets

METHOD FOR FORMING AND DENATURING PARTICLES

BACKGROUND OF THE INVENTION

1. Field of the Invention

The present invention relates to a method for forming and denaturing particles. More particularly, the present invention relates to a method for forming and denaturing particles based on the utilization of a light-induced phase transition of a polymer solution, which permits the formation, modification and processing of polymer particulates and manufacture of switching devices and three-dimensional memories.

2. Description of Related Art

In various fields such as physics, chemistry, biochemistry and electronics, technologies have been studied for micro-processing, control of microstructures, and alteration, processing and modification of matters including biocells, inorganic and organic substances on the micron and submicron order, resulting in practically excellent techniques and structures.

Generation of particulates and control of the dynamic patterns thereof form an area among these new technologies and are attracting attention as an important source of innovations to be achieved hereafter.

The present inventors have carried out extensive studies to open up a new technological prospect, with their eyes on various phenomena regarding generation of particles and control thereof as described above. Phase transition in a polymer solution was one of the phenomena noted in the course of these research efforts. This phase transition is known as a phenomenon in which, when a poly (N-isopropylacrylamide) solution is kept at a temperature more than 31° C., for example, phase transition takes place, leading to generation of particulates of polymer of the submicron order and non-uniform aggregates thereof: phase transition between solid and liquid phases.

However, because the phase transition phenomenon, known as an object of scientific interest, produced only submicron-order particulates and non-uniform aqgregates thereof, development thereof into practicable technologies has been limited.

Particle manipulation based on the utilization of phase transition has been impossible for the conventional technologies, and almost no efforts have so far been made to make such manipulation possible.

However, from the point of view that the solid-liquid phase transition suggested the possibility of generating and manipulating particulates, the present inventors have made their utmost efforts to develop a means to permit such generation and manipulation with a satisfactory reproducibility and high selectivity.

SUMMARY OF THE INVENTION

The present invention was made in view of the circumstances as described above, and has an object to provide a novel method which can carry out dynamic control of particulates, while taking account or the conventional findings concerning phase transition of polymer solution, as a technically more sophisticated manipulation.

More particularly, the present invention provides, for the purpose of solving the above-mentioned problems, a method for forming and denaturing particles, which method can form polymer particles in the focal area of a laser by irradiating a polymer solution, trapping the thus formed particles by means of the laser beam, causing them to transfer to any desired area, processing and modifying the polymer particles, and causing such particulates to disappear by discontinuing irradiation of the laser beam.

DETAILED DESCRIPTION OF THE INVENTION

The method of the present invention thus comprises the steps of causing phase transition of a polymer solution through irradiation with laser beam, and manipulating the resultant particles. This method can, essentially unlike the conventional phase transition, selectively generate single (uniform) particles of the micron order, for example, in the focal area of light, irreversible fixation of particles and photo-manipulation of particles. The phase transition in the present invention may be called a light-induced phase transition.

The polymer to be used may be selected from among polyvinylmethylether, polyvinylmethyloxazoridinone, poly (N-isopropylacrylamide) and any others which generate a so-called thermal phase transition, as well as various light-sensitive phase-transition polymers. The medium composing the solution may be selected from the group consisting of water, salt solution, alcohol, ether, glycol and various other organic solvents.

Any of the various embodiments proposed to date may be adopted also for the laser beam irradiation system, or for trapping by laser beam for processing-/modification of the particles.

In the present invention, furthermore, particles may be made reversibly both in formation and disappearance thereof, and in addition, may be fixed in an irreversible solid state.

In this invention, it is possible to generate a reaction between the formed particles and surrounding liquid-phase component, for example, a reactive monomer to form a three-dimensional reticular junction, thus fixing to solid state particles. Conceivable monomers applicable for this purpose include various kinds of vinyl monomers which begin polymerization reaction through light irradiation and polyfunctional monomers.

The formed particulates themselves may internally contain denaturing factors which include ones causing denaturation under the effect of light or heat and thus allow fixation in an irreversible solid phase. Use of a functional group is also conceivable.

The present invention will be described further in detail by means of examples.

EXAMPLE 1

Poly-N-isopropylacrylamlde (PNIPAM) was synthesized under the following conditions.

More specifically, 1.4 g of N-isopropylacrylamide, 0.1 g of ammonium parsulfate, 100 μl of N, N, N', N'-tetraethylethylenediamine, and 100 ml of water were reacted at 30° C. for eight hours. Purification was carried out by adding ethanol and repeating decantation three times in the state in which polymer was precipitated.

From the measurement of viscosity, the molecular weight was estimated to be about 1.1 to $1.9 \times 10^5$. The concentration of this PNIPAM aqueous solution was adjusted to 1.8 to 4.0 wt. %.

When the solution was irradiated with a laser beam, single particles having a size from submicron (presence of which is discernible through microscope) to 10 μm were confirmed, to be precipitated and trapped at the focal position of the laser beam.

FIGS. 1 to 4, which are photo-images, illustrate particles formed at a laser irradiation time (in seconds) of 0, 0.2, 10 and 30 seconds at a temperature of 20° C. and with a laser power of 1.4 W.

Figure 1:
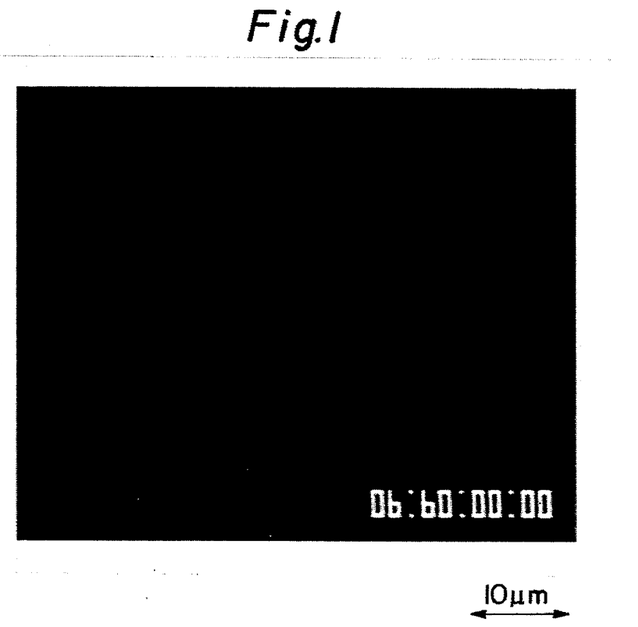
FIG. 1 illustrates a photo-image of a polymer solution 0 second after irradiation of laser beam.
Figure 2:
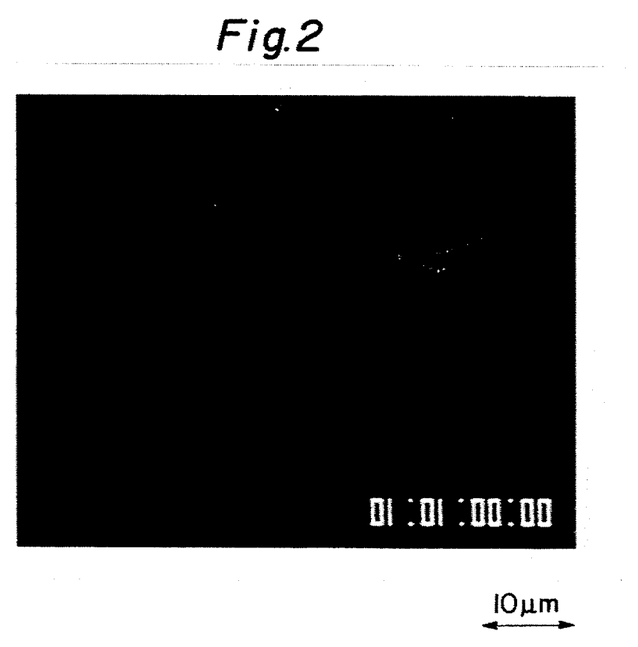
FIG. 2 illustrates a photo-image of a polymer solution 0.2 seconds after irradiation.
Figure 3:
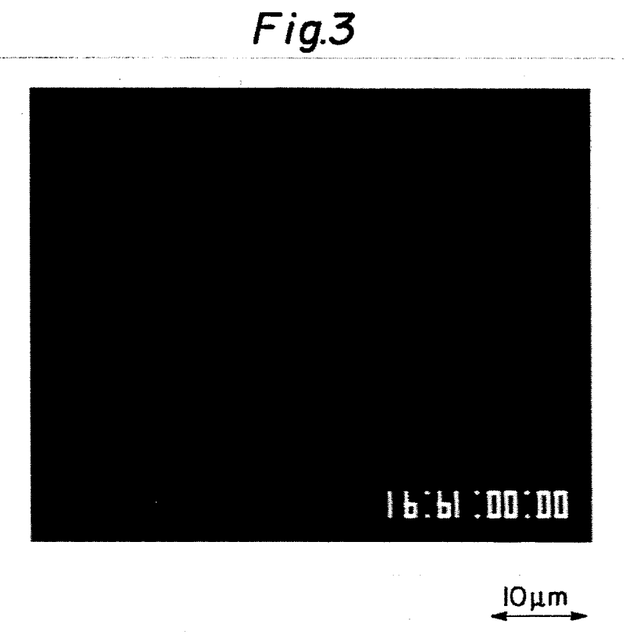
FIG. 3 illustrates a photo-image of a polymer solution 10 seconds after irradiation.
Figure 4:
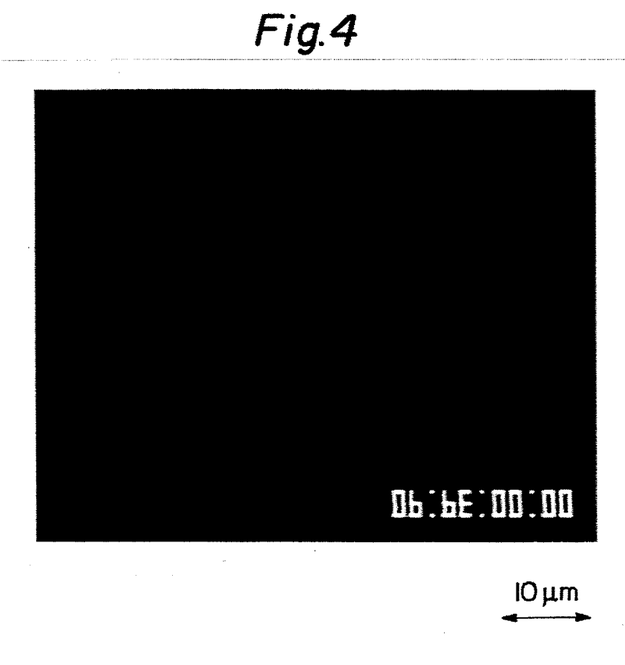
FIG. 4 illustrates a photo-image on the status of polymer solution 30 second after irradiation.
Figure 5:
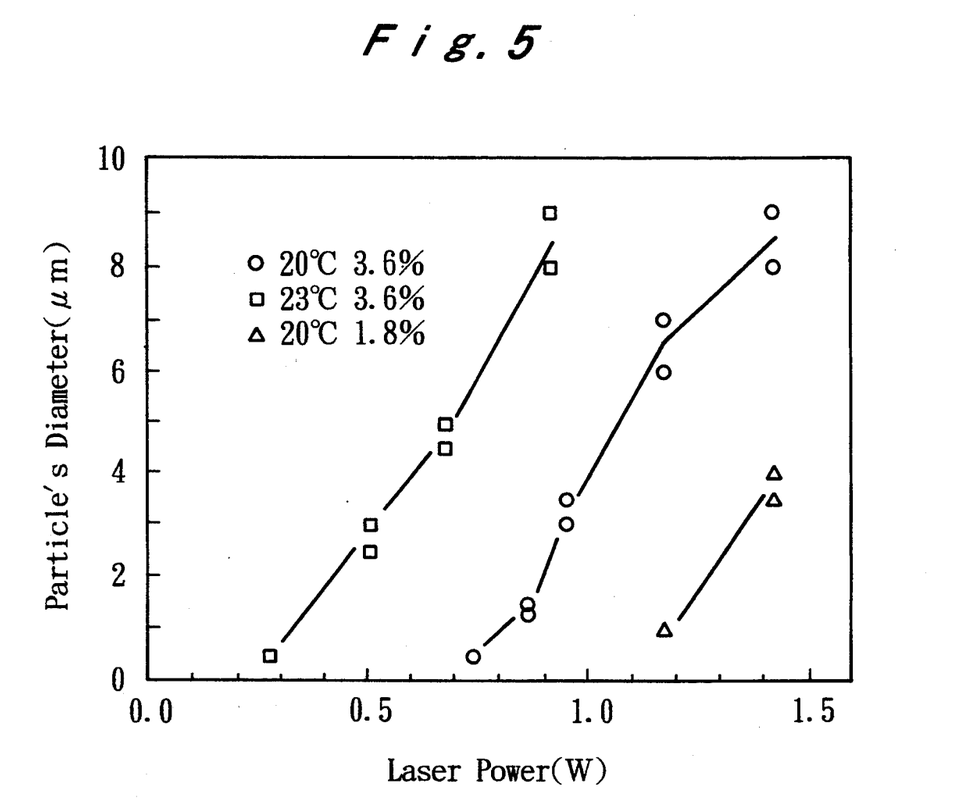
FIG. 5 illustrates a relationship between laser beam intensity and particle size.

The relationship between the equilibrium particle size of formed particles, on the one hand, and the laser beam intensity (under the objective), the room temperature and the polymer concentration, on the other hand, is shown in FIG. 5. This graph reveals that, at a constant room temperature, a higher laser power leads to a larger particle size, that a higher room temperature results in generation of particles with a lower laser power, and that a lower concentration requires a higher laser power. This suggests the possibility of controlling the particle size by properly selecting a laser intensity.

EXAMPLE 2

In the same manner as in the Example 1, precipitation of particulates was observed-in laser irradiation under the following conditions;
Polymer concentration:3.6 wt. %,
Laser intensity:1.2 W,
Atmospheric temperature:20° C.

Figure 6:
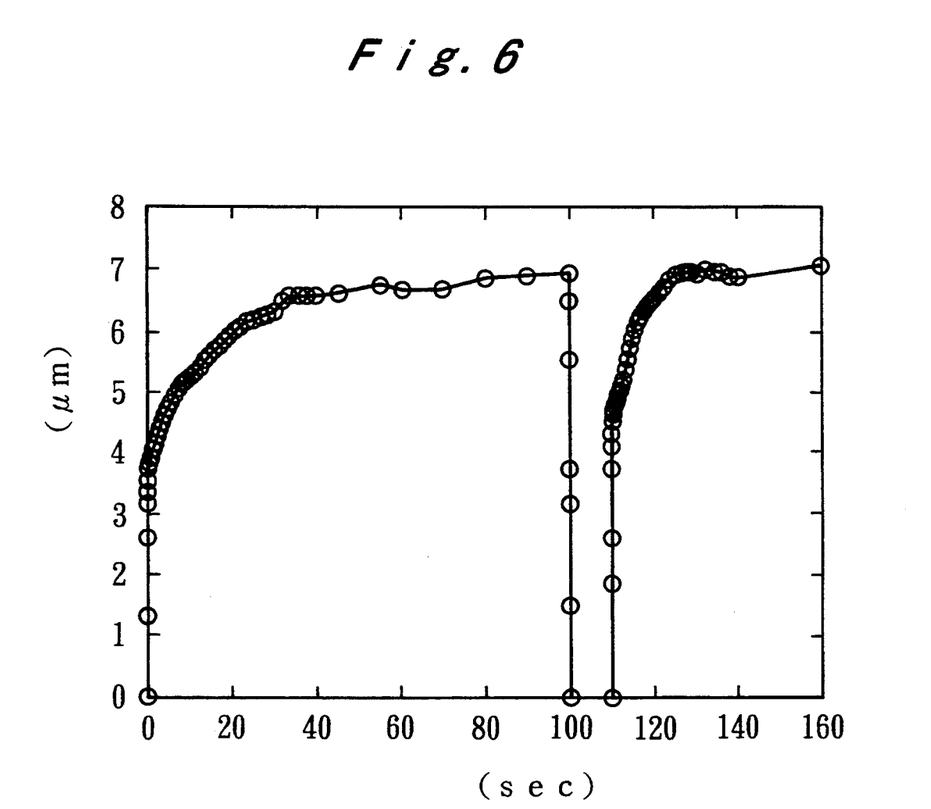
FIG. 6 illustrates a relationship between laser irradiation time and generated particle size.
Figure 7:
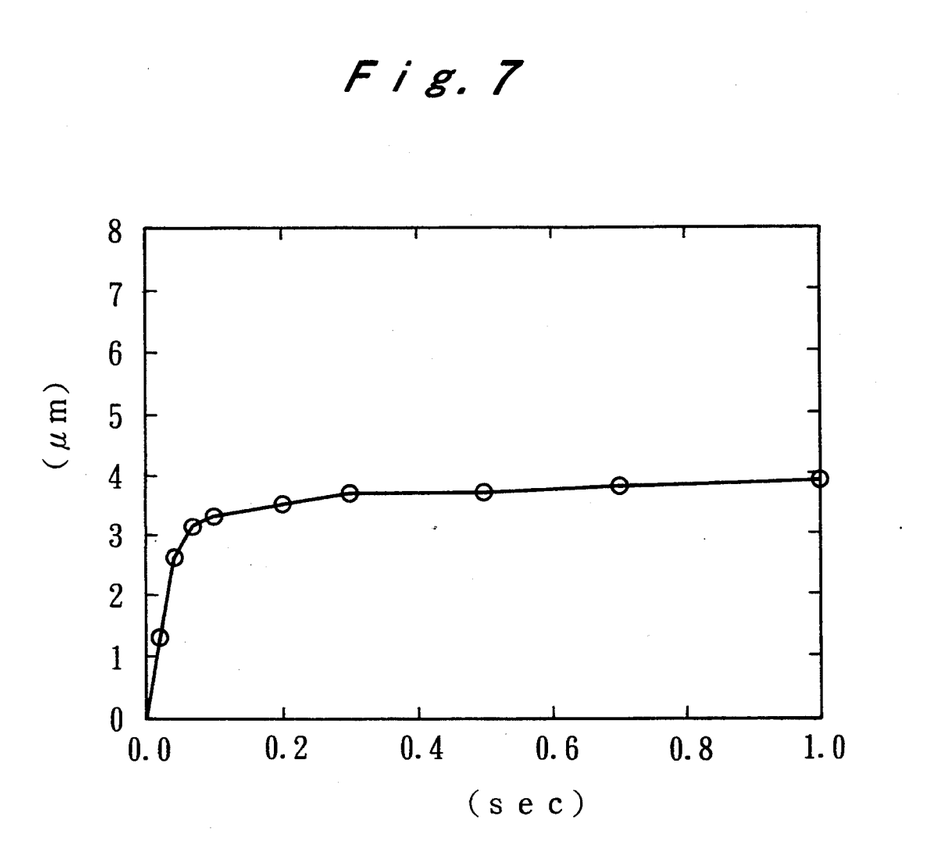
FIG. 7 illustrates a relationship between laser irradiation time and particle size in the case of irradiation for 0 to 1 second.
Figure 8:
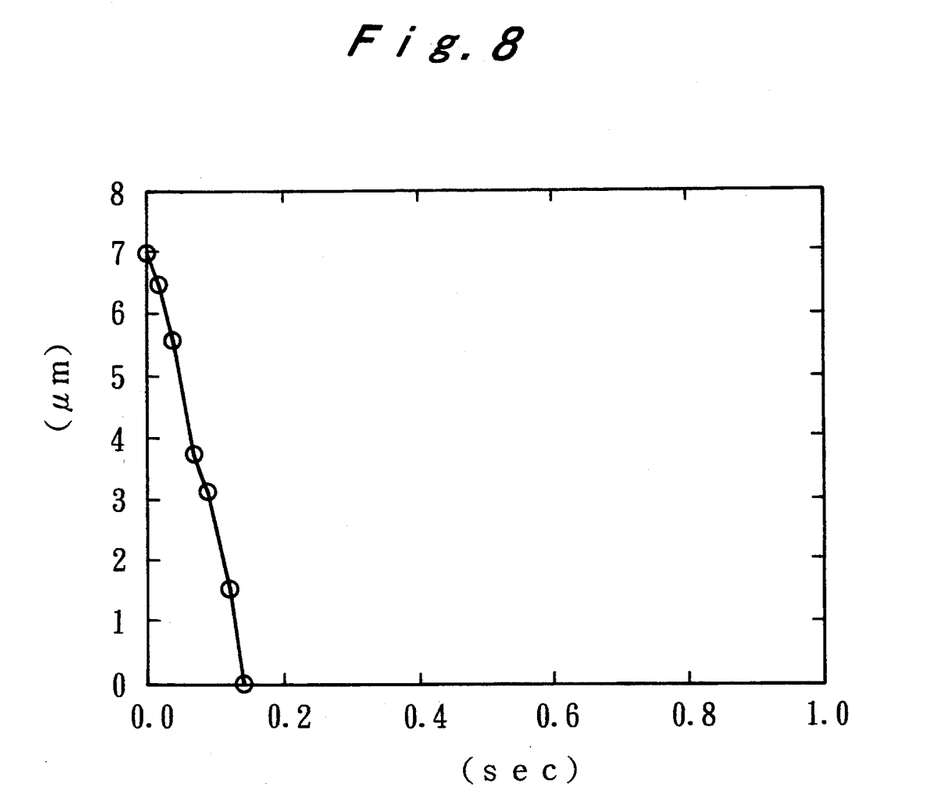
FIG. 8 illustrates a relationship between laser irradiation time and particle size 0 to 1 second after discontinuance of laser irradiation.

FIG. 6 illustrates the effect of a laser irradiation process (time) comprising laser irradiation for 100 seconds, discontinuance of laser irradiation for the next ten seconds, and then another laser irradiation for 50 seconds on the particle size (μm). FIG. 7 illustrates the progress of particle generation during a second in terms of changes in the particle size. FIG. 8 illustrates the process of disappearance of particles during a second immediately after discontinuance of laser beam irradiation in the form of changes in the particle size.

These drawings suggest that precipitation and disappearance of particles are accomplished in a very short period of time. Precipitation in about 100 msec is followed by a slow change in the radius. While upon discontinuance of laser beam irradiation, particles disappear quickly, reirradiation immediately after discontinuance causes particles to promptly recover their equilibrium particles size.

PMMA latex having a particle size of 1 μm were previously mixed as particles of a different kind and laser beam was irradiate. Particles were precipitated also in this case and trapped by laser beam.

EXAMPLE 3

After finding that the fluorescent spectrum of polymer solution added with $2 \times 10^{-4}$ of anilinonaphthalene sulfonate (ANS) showed a change under the effect of phase transition at an ordinary temperature, laser beam was irradiated in the same manner as in the Example 1. Whether or not a similar change occurred along with the formation of particles under microscope was evaluated.

The measurement of fluorescence comprised two kinds of evaluation; a sample prepared by adding ANS to polymer solution was put in a 10 mm rectangular cell and measurement was carried out with a fluorescent spectroscope while changing temperature, on the one hand, and measurement was made with SMA by irradiating 355 nm pulse laser under a microscope, on the other hand.

Changes in fluorescent spectra at a temperature (39° C.) below the phase transition temperature and a temperature (32° C.) above the latter as measured with a usual fluorescent spectrophotometer are illustrated in FIGS. 6 and 7 respectively. The peak wavelength is found to largely shift from about 520 nm to about 470 nm, and hydrophobicity increases at high temperatures. the fluorescent intensity increases its whiteness upon occurrence of phase transition: although this cannot be accurately compared, it became higher by several tens of times.

Figure 9:
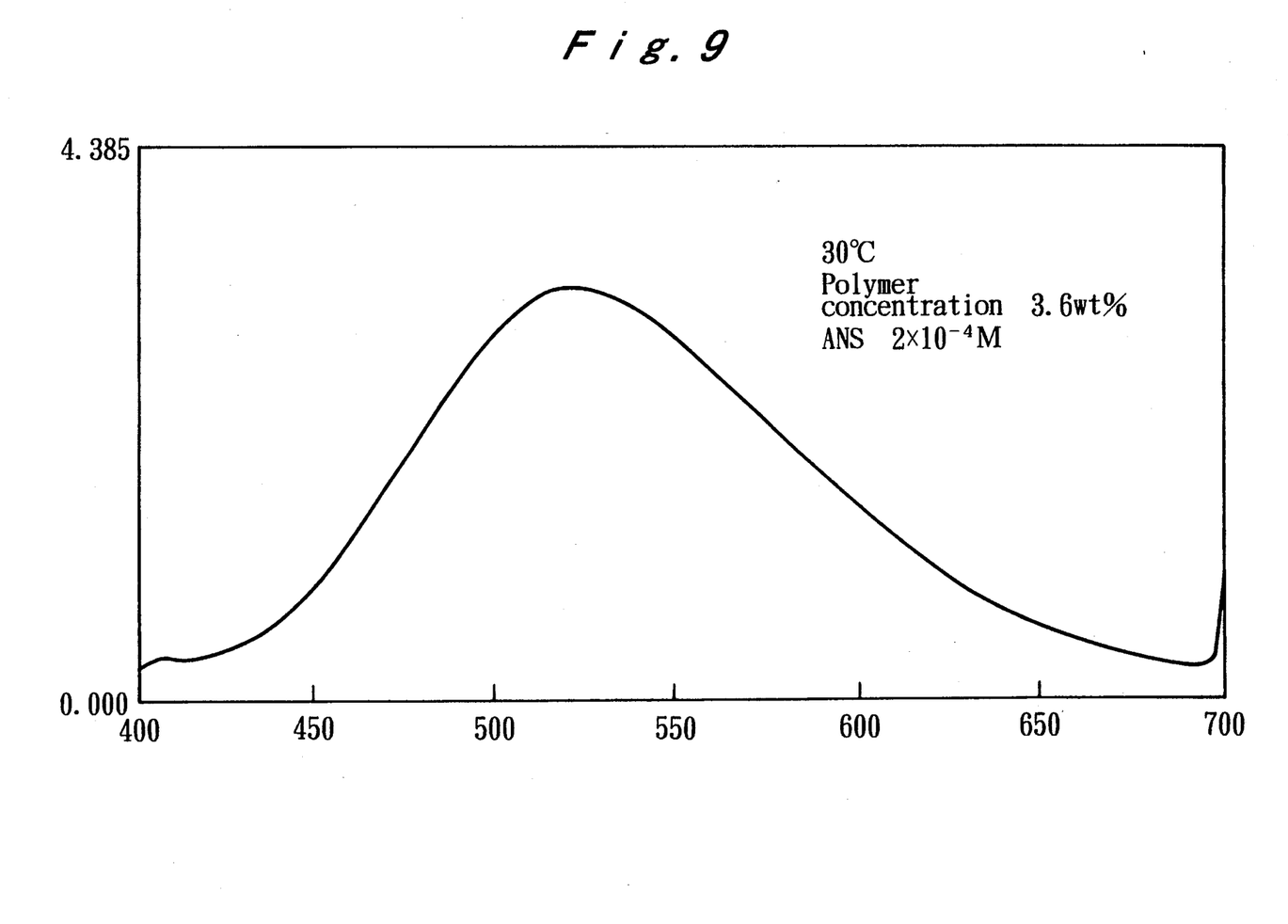
FIG. 9 illustrates a fluorescent spectrum diagram.
Figure 10:
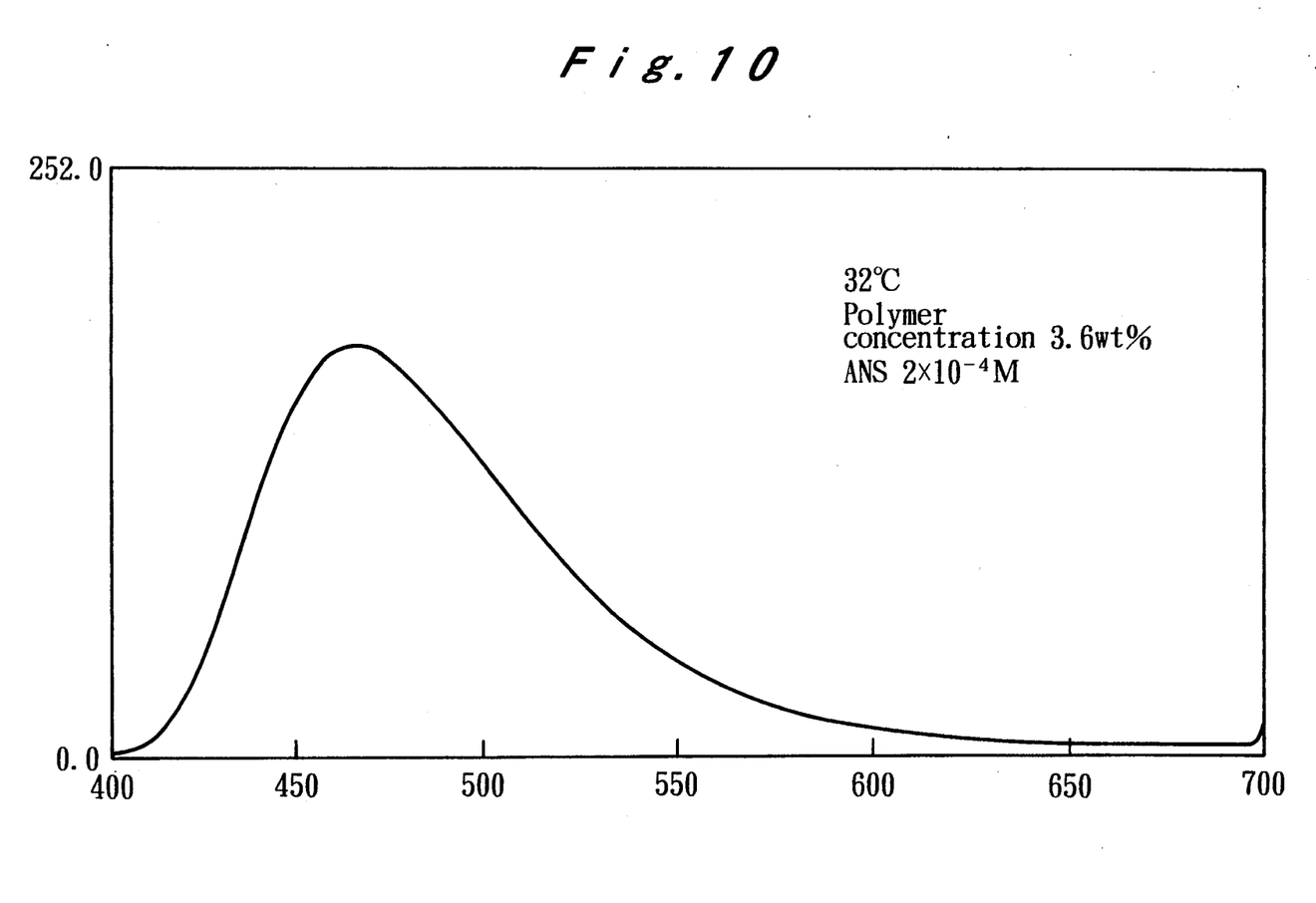
FIG. 10 illustrates another fluorescent spectrum diagram.
Figure 11:
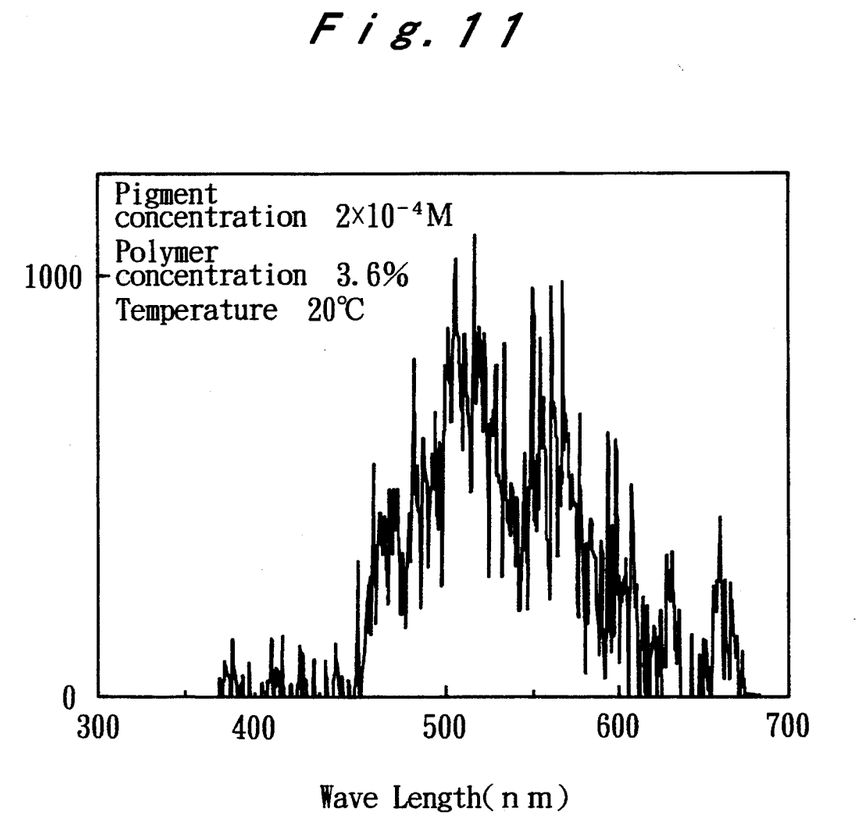
FIG. 11 illustrates a fluorescent spectrum diagram during irradiation of laser beam.
Figure 12:
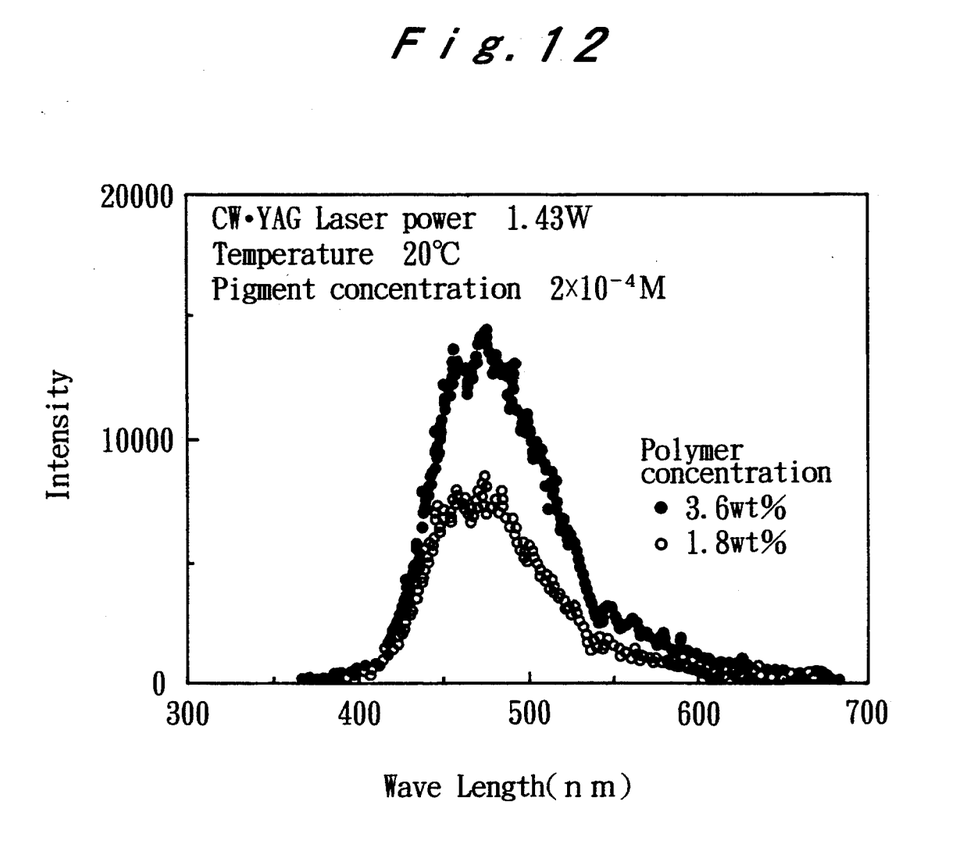
FIG. 12 illustrates further another fluorescent spectrum diagram.

With regard to fluorescent spectrum under the microscope, on the other hand, the case without 1,064 nm laser beam irradiation is represented in FIG. 8, and formation of particles under irradiation of laser beam, in FIG. 9.

Without relying upon the polymer concentration, a shift of the peak wavelength due to temperature change similar to that caused by phase transition was observed, with a considerable change in intensity. It was revealed from other measurements that the peak wavelength did not depend upon the laser beam intensity of 1,064 nm or on the pigment concentration, but takes similar values.

These findings suggest that the change occurring during laser irradiation is a phenomenon substantially similar to phase transition caused by temperature.

The fluorescent intensity demonstrated the following basic tendencies:
(1) When changing the polymer concentration with the other conditions kept constant, a lower polymer concentration (a smaller particle size) leads to a lower fluorescent intensity (see FIG. 9).
(2) When changing the intensity of laser beam of 1,064 nm, a lower intensity (a smaller particle size) results in a lower fluorescent intensity.
(3) A lower pigment concentration corresponds to a lower fluorescent intensity.

The possibility was thus confirmed to control the light intensity also by the method of the present invention.

EXAMPLE 4

For the polymer particles generated in the Example 1, the focal point of laser beam irradiation was moved.

This permitted spatial displacement of particles along this movement.

When irradiating pulse laser beam for processing to these particles thus moved, although local breakage of particles was produced as a result, the particles recovered their original state along with the lapse of time. These phenomena of breakage and recovery suggest the possibility of applying to the recovery of particles.

When bringing two trapped particles into contact with each other, there occurs a junction of the two particles.

EXAMPLE 5

Acryl amide as a water-soluble vinyl monomer and a water-soluble polymerization starting agent were added to aqueous solution of poly-N-isolpropylacrylamide (PNIPAM) used in the Example 1 and 1,064 nm CW $Nd^{3+}$YAG laser beam (for generating particles by phase transition) and 35 nm ultraviolet laser beam (for starting polymerization reaction) were simultaneously irradiated.

Formation of particulates through photo-thermal phase transition caused by 1,064 nm beam and polymerization of vinyl monomer only in light-irradiated portion of the solution were started. This resulted in the formation of water-insoluble spherical macromolecular gel having a three-dimensional reticular structure through reaction between the macromolecular chain of poly-N-isopropyl-acrylamide and acrylamide in the vinyl monomer.

These gel particles did not disappear even after discontinuance of irradiation of 1,064 nm laser beam. Irreversible fixing of particles was thus achieved.

These particles were employed as the object of trapping and displacement by laser beam.

It is needless to mention that the present invention is not limited to the examples presented control operations. For example, by using laser beam of a different wavelength without being limited to 1,064 nm laser, the present invention is well applicable through use of a compound generating heat by absorbing this wavelength as solvent, additive or polymer.

When oil drops prepared by doping a hydrophobic substance are previously dispersed in polymer solution, and trapping particles made hydrophobic via laser phase transition are brought into contact with the oil drops or the crystals, the particles are doped with the hydrophobic substance such as pyrene. Considering that the hydrophobic substance contained does not easily come off the particles even by moving the particles to another place, a change in the particles size is considered to lead to change in the hydrophobic substance concentration.

Furthermore, the present invention is applicable to a switching device and a three-dimensional memory by the utilization of formation and disappearance of particles caused by turning on and off the light irradiation.

According to the present invention, as described above in detail, a light-induced phase transition can achieve a formation and manipulation of polymer particles.

What is claimed is:

1. A method for forming a polymer particle, which comprises the steps of:
    irradiating a polymer solution with a laser beam having a focal area in the polymer solution, and
    forming a polymer particle in the polymer solution at the focal area of the laser beam.

2. The method for forming a polymer particle according to claim 1, wherein the polymer is selected from the group consisting of thermal phase transition polymer and light-sensitive phase transition polymer.

3. The method for forming a polymer particle according to claim 1, the polymer solution further includes a reactive monomer, and wherein the polymer particle which is formed at the focal area of the laser beam has an irreversible solid state, caused by a reaction between the polymer particle and the reactive monomer.

4. A method for denaturing a polymer particle, which comprises the steps of:
    irradiating a polymer solution with a laser beam having a focal area in the polymer solution,
    forming a polymer particle in the polymer solution at the focal area of the laser beam, and
    discontinuing the laser beam irradiation thereby causing the polymer particle to disappear.

5. The method for denaturing a polymer particle according to claim 4, wherein the polymer is selected from the group consisting of thermal phase transition polymer and light-sensitive phase transition polymer.

6. A method for trapping a polymer particle, which comprises the steps of:
    irradiating a polymer solution with a laser beam having a focal area in the polymer solution, and
    forming a polymer particle in the polymer solution at the focal area of the laser beam, wherein the polymer particle is trapped by the light beam irradiation.

7. A method for moving a trapped polymer particle which comprises the steps of:
    irradiating a polymer solution with a laser beam having a focal area in the polymer solution,
    forming a polymer particle in the polymer solution at the focal area of the laser beam, wherein the polymer particle is trapped by the light beam irradiation, and
    moving the laser beam trapping the polymer particle to thereby move the trapped polymer particle in the polymer solution.

* * * * *